United States Patent
Popelka et al.

(10) Patent No.: US 11,042,434 B2
(45) Date of Patent: Jun. 22, 2021

(54) DATABASE INGESTION ACROSS INTERNAL AND EXTERNAL DATA SOURCES USING ERROR RATE HANDLING

(71) Applicant: salesforce.com, inc., San Francisco, CA (US)

(72) Inventors: Aaron M. Popelka, San Francisco, CA (US); Joshua L. Sarver, Brownsburg, IN (US); Luke A. Ball, Berkeley, CA (US)

(73) Assignee: salesforce.com, inc., San Francisco, CA (US)

( * ) Notice: Subject to any disclaimer, the term of this patent is extended or adjusted under 35 U.S.C. 154(b) by 172 days.

(21) Appl. No.: 16/264,342

(22) Filed: Jan. 31, 2019

(65) Prior Publication Data
US 2020/0250026 A1 Aug. 6, 2020

(51) Int. Cl.
*G06F 11/00* (2006.01)
*G06F 11/07* (2006.01)
*G06F 16/25* (2019.01)

(52) U.S. Cl.
CPC ........ *G06F 11/0769* (2013.01); *G06F 11/076* (2013.01); *G06F 11/0727* (2013.01); *G06F 11/0781* (2013.01); *G06F 11/0787* (2013.01); *G06F 16/252* (2019.01)

(58) Field of Classification Search
CPC .............. G06F 11/0769; G06F 11/076; G06F 11/0781; G06F 11/0787; G06F 11/327
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Charles Ehne
(74) *Attorney, Agent, or Firm* — Weaver Austin Villeneuve & Sampson LLP

(57) ABSTRACT

Disclosed are some implementations of systems, apparatus, methods, and computer program products for performing error rate handling as data is ingested across data sources. Notifications are generated and transmitted according to a hierarchical configuration. The hierarchical configuration includes two or more tiers of notification settings, where each tier corresponds to a different error rate threshold and has a corresponding set of notification parameters. A set of notification parameters can identify one or more sets of individuals to be notified upon determining that the error rate exceeds the corresponding error rate threshold. As the error rate increases, notifications may be generated and transmitted according to further tiers of the hierarchical configuration.

20 Claims, 12 Drawing Sheets

(56) References Cited

U.S. PATENT DOCUMENTS

| | | |
|---|---|---|
| 5,983,227 A | 11/1999 | Nazem et al. |
| 6,092,083 A | 7/2000 | Brodersen et al. |
| 6,101,500 A * | 8/2000 | Lau .................... G06F 16/9027 |
| | | 707/696 |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,063,632 B2 | 6/2015 | Beechuk et al. |
| 9,177,007 B2 | 11/2015 | Winters et al. |
| 9,223,672 B1 * | 12/2015 | Honton ............... G06Q 10/101 |
| 9,529,488 B2 | 12/2016 | Beechuk et al. |
| 9,823,813 B2 | 11/2017 | Beechuk et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Brand et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0036333 A1* | 2/2013 | Lee .................... G06F 11/0733 714/57 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0290783 A1* | 10/2013 | Bowler ............... H04L 41/0681 714/25 |
| 2014/0280329 A1 | 9/2014 | Beechuk et al. |
| 2014/0280577 A1 | 9/2014 | Beechuk et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0026650 A1 | 1/2016 | Winters et al. |
| 2016/0026670 A1 | 1/2016 | Winters et al. |
| 2017/0068646 A1 | 3/2017 | Beechuk et al. |
| 2020/0250143 A1 | 8/2020 | Ball et al. |

\* cited by examiner

DATABASE INGESTION ACROSS INTERNAL AND EXTERNAL DATA SOURCES USING ERROR RATE HANDLING

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with implementation of an error rate handler in an on-demand service environment. More specifically, this patent document discloses techniques for handling errors identified in data obtained from data sources by an associated database system.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with employer network systems, customer relationship management (CRM) systems, social networking systems, email systems, and instant messaging systems, by way of example, in a cloud computing environment.

When a user interacts with a cloud computing service, the user may access a number of different types of data. Often, the cloud computing service supports numerous users and processes data from a number of different data sources. As a result, the amount of data that is processed can be significant. Unfortunately, the data that is obtained from a data source may contain errors, negatively impacting users accessing the data and system processes that rely upon the accuracy of the data.

BRIEF DESCRIPTION OF THE DRAWINGS

The included drawings are for illustrative purposes and serve only to provide examples of possible structures and process operations for the disclosed inventive systems, apparatus, and methods for implementing a search-based navigation interface to facilitate web site navigation. These drawings in no way limit any changes in form and detail that may be made by one skilled in the art without departing from the spirit and scope of the disclosed embodiments.

DETAILED DESCRIPTION

Figure 1:
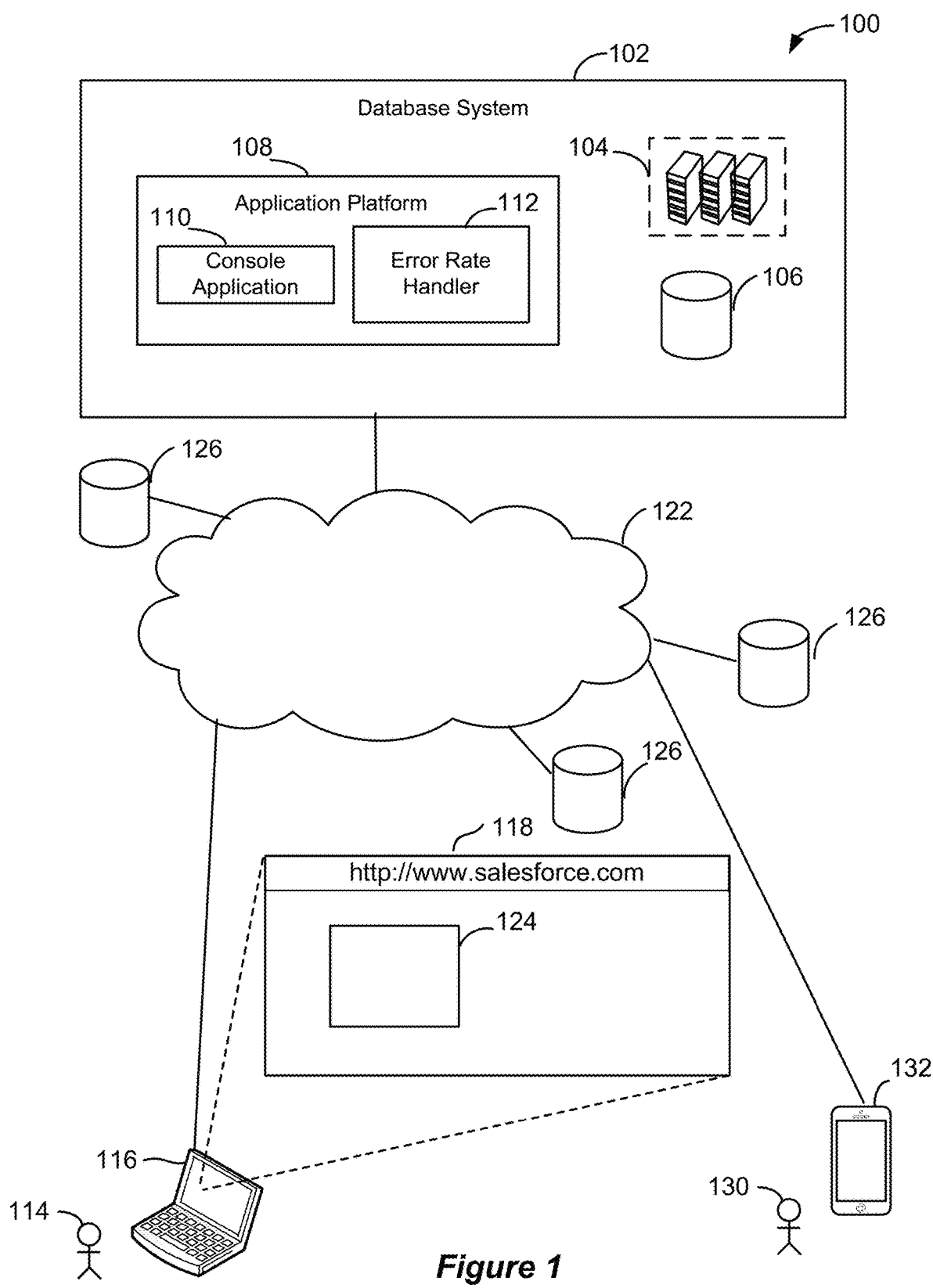
FIG. 1 shows a system diagram of an example of a system 100 in which an error rate handler may be configured and implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Various implementations described or referenced herein are directed to different methods, apparatus, systems, and computer program products for facilitating error rate handling in data obtained from data sources in an on-demand service environment. In some implementations, the disclosed methods, apparatus, systems, and computer program products may be configured or designed for use in a multi-tenant database environment.

The disclosed implementations generally relate to error rate handling in data obtained from data sources accessible by a database system. Error rate handling may be performed by an error rate handler of the database system according to a configuration generated based, at least in part, on user input received via a graphical user interface (GUI). Notifications of errors in data are generated and transmitted according to the configuration.

In some implementations, the configuration may support "high touch" and "low touch" notification, where the low touch notification is transmitted in relation to data having a first error rate and the high touch notification is subsequently transmitted in relation to data having a second error rate that is higher than the first error rate. The low touch notification may be transmitted according to a first set of configuration parameters, while the high touch notification may be transmitted according to a second set of configuration parameters. More particularly, the low touch notification is transmitted after determining that the first error rate exceeds a first error rate threshold associated with the first set of configuration parameters, and the high touch notification is subsequently transmitted after determining that the second error rate exceeds a second error rate threshold associated with the second set of configuration parameters.

In some implementations, the error rate handler provides a GUI that facilitates configuration of the error rate handler by a user. More particularly, a configuration that is generated may be associated with at least one data source. The configuration may indicate a hierarchy of two or more different error notification tiers, where each of the error notification tiers corresponds to a different one of two or more error rate thresholds that are configurable by a user. Each of the error notification tiers may be associated with a corresponding set of error notification parameters, which is configurable by a user. Each set of error notification parameters can indicate one or more sets of individuals to be notified of errors in data obtained from the data source and for each set of individuals, at least one communication channel via which the set of individuals is to be notified.

In some implementations, a set of error notification parameters may indicate the content of the notification to be transmitted in association with a particular set of individuals, a time that the notification is to be transmitted to the particular set of individuals, the number of times or frequency that the notification is to be transmitted to the set of individuals, and/or conditions that, when satisfied, discontinue the notifications. The content can include text, an image, a uniform resource locator (URL), or a link.

In some implementations, the error rate handler supports generating a configuration that is specific to a particular data source or set of data sources. The data source(s) for which a configuration is being generated can be selected by a user via a GUI. The set of data sources may be explicitly identified by a user via a GUI during the configuration process. Alternatively, the set of data sources may be implicitly identified by a user via a GUI during the configuration process by, for example, selecting a particular type or category of data. Therefore, multiple configurations may be generated, where each of the configurations is stored in association with a different set of data sources.

In some implementations, the database system is associated with a web site via which a configuration interface is provided for display at a client device. The configuration interface may enable a user to configure the error rate handler to generate and transmit notifications according to a tiered configuration, as described herein. In addition, the database system may provide a dashboard interface for display at a client device. Information presented via the dashboard interface may pertain to the status of data sources from which the database system may obtain data.

In some implementations, the error rate handler and dashboard interface, if present, operate within the context of an organization of users of a database system. More particularly, the database system may obtain data from data sources that are internal to the database system and/or data sources that are external to the database system. In some instances, a data source or data stored therein may be accessed only by users within the organization or selected users within the organization that have access rights to the database system, data source, or associated data.

In some implementations, the error rate handler may access user profiles of users of the database system. More particularly, information in user profile(s) may be accessed during the configuration process to facilitate configuration of error notification parameters and/or to verify permissions of a user configuring the error rate handler. In addition, information in user profile(s) may be accessed during the generation and transmission of error rate notifications. The user profile(s) accessed by the error rate handler can include a profile of a user initiating the generation (or update) of an error rate configuration and/or a profile of a target user to whom a notification is being transmitted.

In some implementations, the database system is a customer relationship management (CRM) system. The data can include objects of various object types maintained in one or more data sources by the CRM system. Example object types include, but are not limited to, an Account, a Contact, a Lead, a Case, and Opportunity.

By interacting with a configuration interface, a user may facilitate the generation of a tiered error notification configuration of an error rate handler. The error rate handler may be configured to apply the tiered error rate configuration to generate and transmit notifications. Through application of the tiered error notification configuration, this ensures that the appropriate individuals are notified via appropriate channels as the error rate of data increases. The disclosed methods, apparatus, and systems are further configured to render interfaces or parts of interfaces in web browser processes running on client machines.

Notifications of errors in data are often transmitted to a single set of individuals such as an information technology (IT) professional. However, as organizations expand, the amount and frequency of such notifications can become burdensome for such individuals. In addition, as organizational network systems expand the number and types of data sources from which data is obtained, a number of different entities and processes may be impacted. As the complexity of these network systems increase, errors in data can cause negative consequences that cannot easily be reversed. Unfortunately, existing error notification systems do not enable different entities to be notified as the error rate increases.

In some implementations, an error rate handler is configured to generate and transmit notifications as the error rate increases according to a tiered error rate notification configuration. As notifications are generated and transmitted, different sets of individuals may be notified. As a result, the system anomalies causing the data errors may be quickly identified and eliminated.

By way of illustration, John is a manager of a Sales group at an organization, Salesforce, Inc. John logs into a console application via his computing device and accesses a console interface provided by the console application. John then accesses a web page provided by the console interface that facilitates configuration of the error rate handler. The user interface rendered within a browser window presents a number of user-selectable options that each corresponds to a criterion that is user-selectable.

John submits user input via the user interface to configure the error rate handler. More particularly, John configures the error rate handler to have two different tiers of error notification settings for data source A. The first tier corresponds to a first error rate threshold of 1000/s, while the second tier corresponds to a second error rate threshold of 2000/s. John configures the first tier to transmit notifications of error rates exceeding the first error rate threshold to his own email address, and configures the second tier to transmit notifications of error rates exceeding the second error rate threshold to his own email address and the email address of the director of the Sales group.

The error rate handler monitors the error rate of data obtained from data source A. When the error rate handler ascertains that the error rate is 1010/s and exceeds the first error rate threshold, the error rate handler sends a notification that indicates the error rate of 2010/s for data source A to John at his email address. Approximately 1 hour later, the error rate handler ascertains that the error rate is 2050/s and exceeds the second error rate threshold, which triggers the error rate handler to send a second notification that indicates the error rate of 2050/s for data source A to both John and the director of the Sales group at their respective email addresses.

FIG. 1 shows a system diagram of an example of a system 100 in which an error rate handler may be configured and implemented, in accordance with some implementations. In FIG. 1, a tenant database system 102 associated with an organization includes any number of computing devices such as servers 104. The servers 104 are in communication with one or more storage mediums 106 configured to store and maintain relevant metadata used to perform some of the techniques disclosed herein, as well as to store and maintain relevant data and/or metadata generated by the techniques disclosed herein. In this example, storage mediums 106 include tenant data storage configured to store and maintain tenant data generated by or otherwise maintained by tenants of tenant database system 102. Tenant data can include, for example, database records corresponding to clients, accounts, contacts, orders, leads, opportunities, cases, etc. In addition, storage mediums 106 can include web pages and associated metadata such as corresponding Uniform Resource Locators (URLs). Storage mediums 106 can also store objects such as those described in, which may be accessed as described in further detail below.

In some implementations, storage mediums 106 can include user profiles associated with users (and corresponding user accounts) of database system 102. Information maintained in a user profile of a user can include or indicate one or more of the following: preferences of the user, a role of the user within an organization of users of the database system, a group of users within the organization of users of the database system that includes the user, permissions associated with the user, a history of interaction of the user with one or more database records, ownership of one or more database records or data sources, a history of interaction of the user with user(s) within the organization of users of the database system, or a history of interaction of the user with one or more groups of users within the organization of users of the database system. Ownership of a database record can indicate, for example, creation of the database record, responsibility for the database record, and/or having exclusive rights to edit the database record.

In some implementations, the information maintained in a user profile may include personal information for an individual. The personal information can indicate characteristics of the individual. The characteristics may be explicitly specified by the individual and/or may be implicitly derived based upon behavior of the individual. For example, characteristics of the individual may include an age, gender, marital status, height, weight, hair color, level of education, political affiliation, online purchase history, and/or personality characteristics. The personal information can also indicate the individual's home address, work address, and/or contact information. For example, contact information can include a phone number and/or an electronic mail (email) address.

A user profile of a given user may be updated periodically and dynamically by the database system based upon interactions of the user with other users within the organization or interactions with database records of the database system. The user profile may also be updated in response to a user-initiated update to the user profile. In some implementations, the user profile may be updated by a machine learning model.

Database system 102 also includes application platform 108. Application platform 108 of tenant database system 102 may be a framework that allows applications of the tenant database system 102 to run. For example, application platform 108 may include hardware and/or software, e.g., the operating system. In some implementations, application platform 108 supports the creation, managing and executing of one or more applications.

Embodiments described herein are often implemented in a cloud computing environment, in which the data network 122, servers 104, storage mediums 106, and/or possible additional apparatus and systems such as multi-tenant databases may all be considered part of the "cloud."

Application platform 108 is configured to support the execution of console application 110. In some implementations, console application 110 may present a navigation interface that enables users to navigate within a corresponding web site and access data objects stored in storage mediums 106. The console application can provide a search or click-based mechanism such as tabs that facilitate access to data objects of various object types, which may be identified by the tabs. Console application 110 is configured to respond to requests from client devices by providing web pages that can be downloaded by client devices. In some implementations, console application 110 may include a customer relationship management (CRM) application.

In some implementations, console application 110 provides a dashboard interface for display at a client device. Information presented via the dashboard interface may pertain to data sources from which the database system can obtain data. In some implementations, console application 110 provides a configuration interface that facilitates the configuration of Error Rate Handler 112 in association with a particular data source, as will be described in further detail below.

In some implementations, application platform 108 is configured to support the execution of Error Rate Handler 112. Error Rate Handler 112 is configured to generate and transmit notifications of data errors, error rates, and/or error rate thresholds that are exceeded according to a tiered error notification configuration, as described herein. In addition, Error Rate Handler 112 may be configured to provide an interface for display by a client device to facilitate the configuration of Error Rate Handler 112 by a user. Servers 104 may be configured to execute Error Rate Handler 112. Servers 104 may also be configured to access data and/or metadata stored in storage mediums 106, external services offered by servers external to database system 102, and/or data maintained in storage mediums outside database system 102.

Storage mediums 106 may further store computer-readable instructions configured to perform some of the techniques described herein. In addition, the storage mediums 106 may store metadata, data, or other information received and/or generated by a tenant as described herein.

In some implementations, tenant database system 102 is configured to store privilege information identifying or specifying access rights and restrictions of users according to various attributes such as a specified user ID, type of user, role of a user, a community or group to which the user belongs, and/or a particular organization on behalf of which a community is maintained. Each of the communities may be operated on behalf of an organization. Each organization may have associated therewith one or more tenants, which may each be associated with one or more communities.

Servers 104 may be associated with a network domain, such as www.salesforce.com and may be controlled by a data provider associated with the network domain. A user of client computing device 116 can have an account at Salesforce.com®. By logging into this account, the user can access the various services provided by servers 104.

In the following examples, it is assumed that user 114 has access rights to console application 110. For example, in the following description, it may be assumed that user 114 has successfully logged into console application 110. In addition, it is assumed that user 114 has permission to access error notification configuration services provided by Error Rate Handler 112 via client computing device 116.

During execution of console application 110, a web page 118 containing an error rate handler configuration interface 124 generated by Error Rate Handler 112 may be downloaded to client computing device 116 via network 122. Upon downloading the web page 118, the web page 118 may be rendered by a web browser within a browser window of client computing device 116. A user may then interact with Error Rate Handler 112 via error rate handler configuration interface 124, as will be described in further detail below.

Client device 116 may be in communication with the data provider via network 122. More particularly, the web browser may communicate with servers 104 via network 122. For example, network 122 can be the Internet. In another example, network 122 comprises one or more local area networks (LAN) in communication with one or more wide area networks (WAN) such as the Internet.

Error rate handler configuration interface 124 can include a user interface object configured to receive user input in association with user-configurable parameters. In response to the user input, Error Rate Handler 112 may store an error notification configuration for subsequent retrieval by Error Rate Handler 112. The error notification configuration may be stored in association with an entity such as a user, group, or organization.

Error Rate Handler 112 can be configured to monitor, in real-time, errors occurring in data obtained by database system 102 from one or more data sources. More particularly, database system 102 can access data generated by database system 102 and/or data generated by data sources 126 external to database system 102. For example, data generated by database system 102 can include data objects stored in storage mediums 106.

Error Rate Handler 112 can calculate an error rate for a particular data source or category of data sources based upon the errors detected. Error Rate Handler can generate and transmit error notifications according to error notification configurations that have previously been generated and stored, as will be described in further detail below. Error notifications for a given configuration may be transmitted to one or more sets of users 130. Each user or set of users may be notified via any number of client devices 132 or communication channels.

Figure 2:
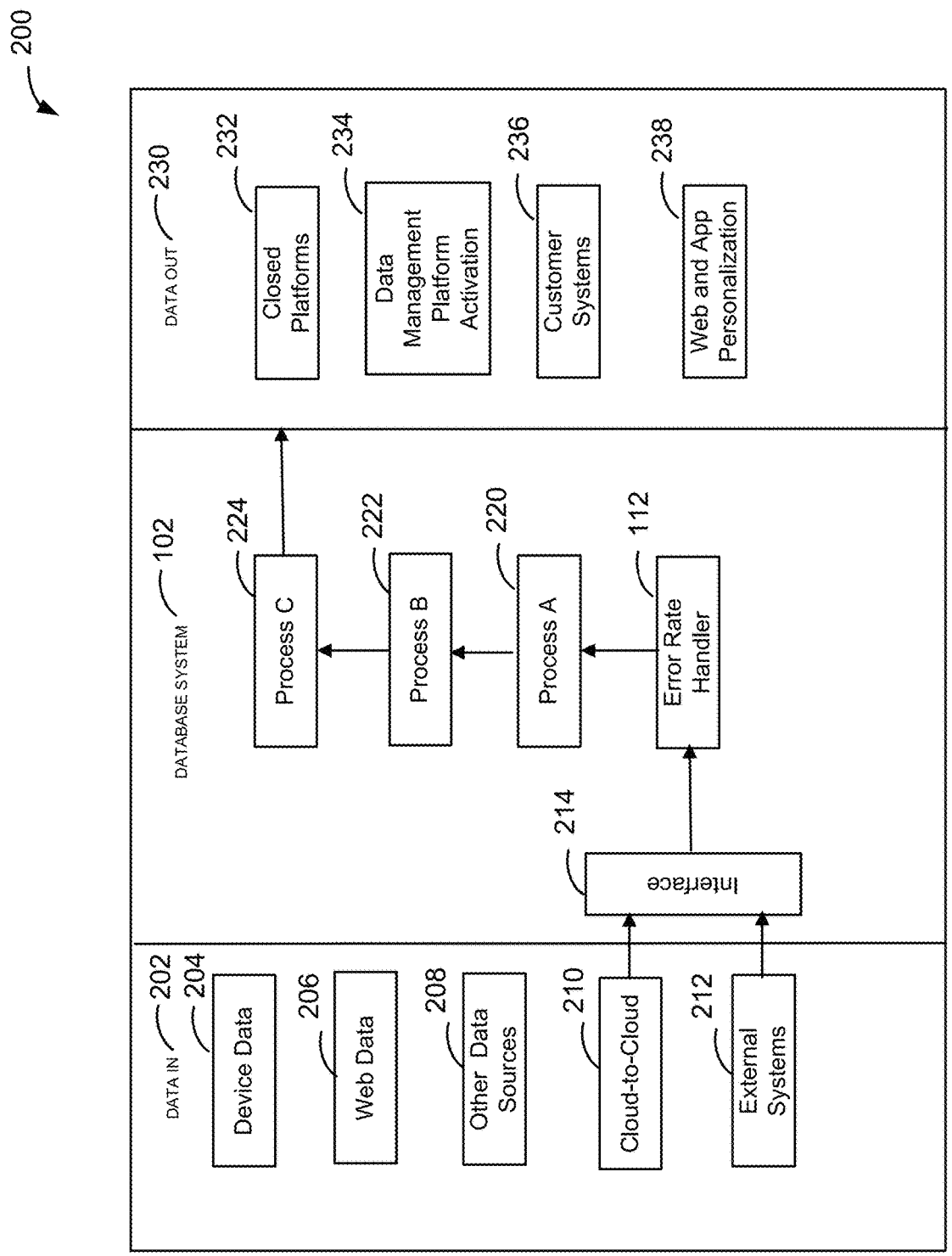
FIG. 2 shows a system diagram of an example of a system 200 in which an error rate handler may process data obtained from data sources, in accordance with some implementations.

FIG. 2 shows a system diagram of an example of a system 200 in which an error rate handler may process data from data sources, in accordance with some implementations. As shown in this example, Data In 202 can include data obtained from one or more data sources. Data can be obtained via streaming technology, push technology, or pull technology.

Data can be obtained by database system 102 from any number of different data sources. In this example, data can be obtained from client devices (Device Data 204), data sources accessible via the Internet (Web Data 206), data sources such as partner data sources (Other Sources 208), data sources implemented in a cloud (Cloud-to-Cloud 208), and/or data sources that are external to database system (External Systems 210). Client devices can include those that are facilitating configuration of Error Rate Handler 112, receiving notifications, responding to notifications, and/or interacting with a web site associated with Database System 102.

Cloud-to-Cloud 208 data sources can include data sources storing data that is stored by Database System 102. This data can include data generated by Database System 102. For example, the data stored in Cloud-to-Cloud 208 data sources can include user engagement data obtained via a Marketing Cloud, service history data obtained via a Service Cloud, and/or browse and purchase history data obtained via a Commerce Cloud.

Data can be obtained from Cloud-to-Cloud 208 data sources and External Systems 210 via one or more application programming interfaces (APIs) such as that shown at 214. Error Rate Handler 112 can process data as described herein prior to processing of the data by one or more system processes. System processes shown in this example include Process A 220, Process B 222, and Process C 224. However, these examples are merely illustrative, and the data or portion thereof may be input to any number or types of processes.

Data may be obtained and processed in real-time. In some implementations, system processes include processing data to provide personalized services or data to users of Database System 102. In addition, personalized messages may be generated and transmitted via a variety of devices, communication media, and/or applications.

As shown in FIG. 2, a variety of complex system processes may rely upon data obtained by Database System 102. As a result, data containing errors can significantly and negatively impact data and messages generated by these processes. This can impact internal processes and systems of Database System 102. In addition, these errors can be propagated through the generation of data that is output by these processes, represented by Data Out 230. Therefore, users and customers of Database system 102 may receive data that is erroneous and unreliable.

Data can be output by system processes of Database System 102 to any number and types of applications, systems, and/or devices. For example, data can be output to Closed Platforms 232, Data Management Platform (DMP) Activation 234, Customer Systems 236 such as tenants or users of Database System 102, and/or Web and App Personalization 238. Therefore, propagation of errors can impact a variety of users, systems, applications, and platforms.

Given the potential impact of erroneous data and the difficulty with which propagation of errors can be reversed, Error Rate Handler 112 may process data in real-time prior to its processing by system processes. In addition, Error Rate Handler 112 generates and transmits notifications in real-time, ensuring that errors will be handled in a timely manner.

Figure 3A:
FIG. 3A shows an example of a graphical user interface (GUI) 300 including an interface for providing data source status information for presentation on a display device of a client device in an on-demand database service environment, in accordance with some implementations.

FIG. 3A shows an example of a graphical user interface (GUI) 300 including an interface for providing data source status information for presentation on a display device of a client device in an on-demand database service environment, in accordance with some implementations. As shown in FIG. 3A, a user of Database System 102 may monitor status information pertaining to data ingestion from data sources. In this example, the user's profile indicates that the user has permission to access the information presented in GUI 300 and has permission to be notified of errors, as indicated in GUI 300.

In this example, GUI 300 is presented in the form of a table, where each row pertains to a corresponding Data Source 300. GUI 300 may indicate, for each Data Source 302, a Frequency 304 with which data is obtained from Data Source 300. For example, the frequency with which data is obtained may be hourly, daily, or streaming. GUI 300 may also indicate a Type 306 of Data Source 302.

In some implementations, GUI 300 enables the user to configure data ingestion according to one or more of fields 302, 304, 306, 308, 310, 312. For example, the user may modify a notification configuration according Notify Me field 308. Notify Me field 308 can indicate circumstances in which the user is to be notified of data errors in data obtained from the corresponding Data Source 302. In some instances, Notify Me field 308 can indicate an error rate above which the user will be notified by Error Rate Handler 112. For example, Notify Me field 308 can indicate the error rate in terms of a numerical percentage, that the user is to be notified of All Errors, or the user is to be notified of No Errors. Example interfaces supporting configuration of Error Rate Handler 112 will be described in further detail below with reference to FIGS. 4A and 4B.

GUI 300 may also indicate an identity of an Owner 310 of Data Source 302. The owner may be the user or may be a different individual. In some implementations, Notify Me field 308 can indicate circumstances in which the owner is to be notified rather than the user to whom GUI is presented. For example, Notify Me field 308 can indicate a numerical percentage of the error rate above which the owner is to be notified, that the owner is to be notified of All Errors, or the owner is to be notified of No Errors.

GUI may further include a Connected field 312 that indicates whether Data Source 302 is currently connected to Database System 102. In other words, Connected field 312 may indicate whether data is currently being ingested from Data Source 302 by Database System 102.

Figure 3B:
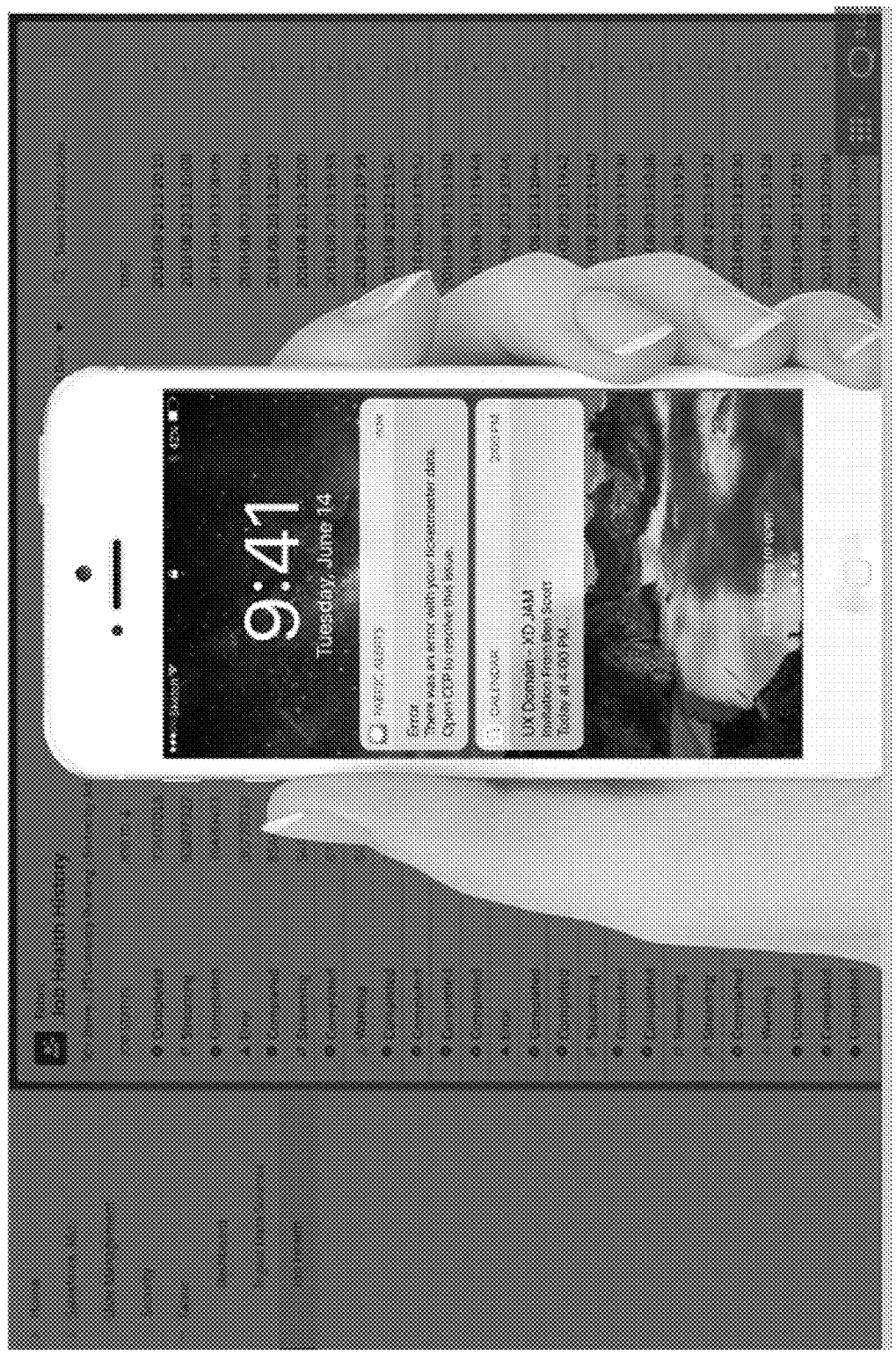
FIG. 3B shows an example of a notification 350 generated for presentation on a display device of a client device in an on-demand database service environment, in accordance with some implementations.

FIG. 3B shows an example of a notification 350 generated for presentation on a display device of a client device in an on-demand database service environment, in accordance with some implementations. In this example, the client device is a mobile device and Notification 350 is transmitted via text message. Notification 350 can identify or otherwise indicate the data source in which errors have been detected, indicate that errors have been detected, indicate an error rate, and/or indicate an action to be taken by the user. For example, Notification 350 can indicate an action that can be taken to resolve the cause of the errors, access further information pertaining to the errors, and/or respond to Notification 350.

A user may configure Error Rate Handler 112 via a configuration interface. Examples of configuration interfaces that may be provided for presentation via a client device will be described in further detail below with reference to FIGS. 4A and 4B.

According to various implementations, a configuration can indicate a hierarchy of two or more tiers of notification settings. In the following examples, a first and second tier of a configuration hierarchy will be described with reference to FIG. 4A and FIG. 4B, respectively.

Figure 4A:
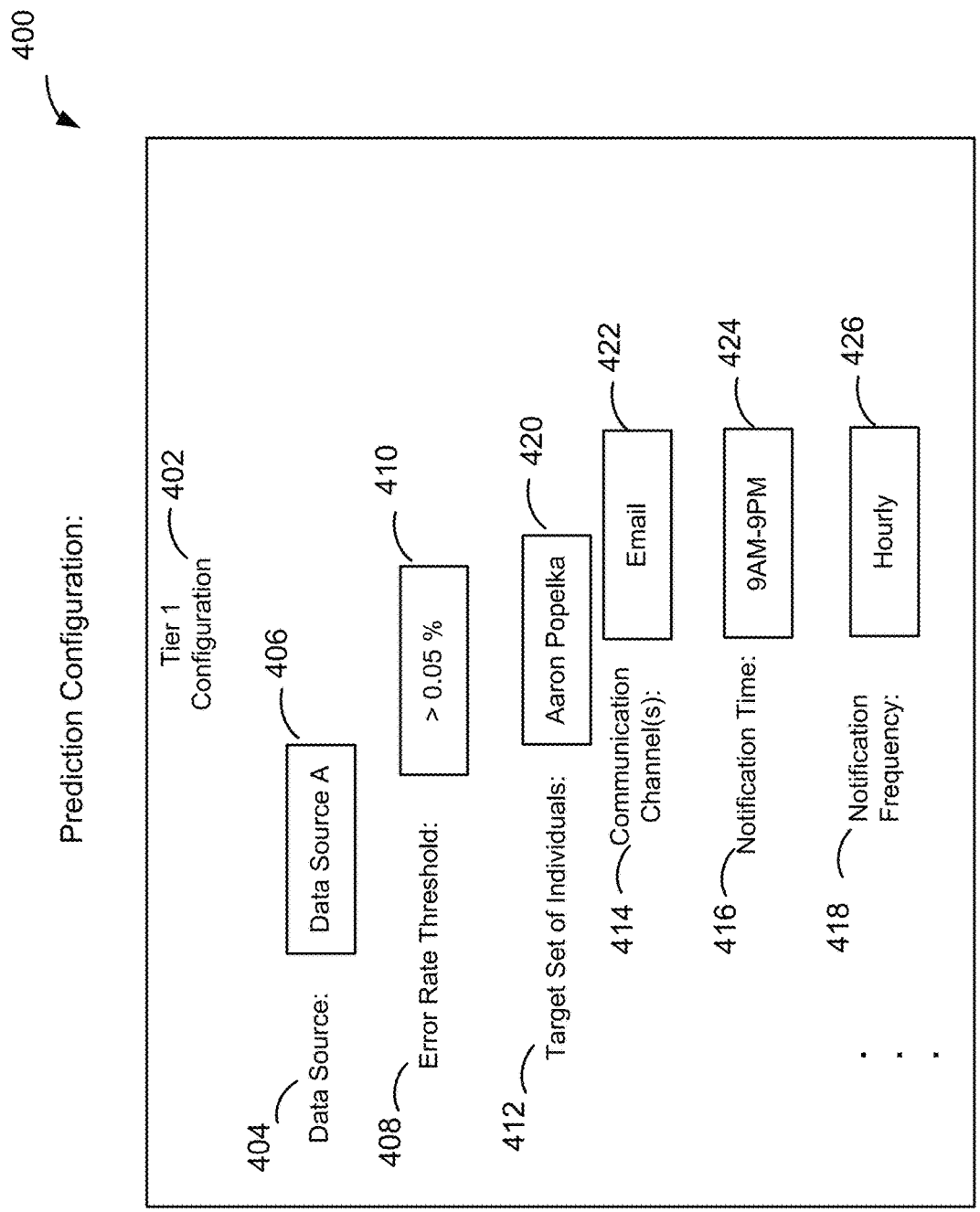
FIG. 4A shows an example of a GUI 400 including a configuration interface for facilitating configuration of an error rate handler for presentation on a display device of a client device in an on-demand database service environment, in accordance with some implementations.

Error Rate Handler 112 may facilitate the generation of a tiered error rate notification configuration by generating and providing a GUI for display by a client device. FIG. 4A shows an example of a GUI 400 including a configuration interface for facilitating configuration of an error rate handler for presentation on a display device of a client device in an on-demand database service environment, in accordance with some implementations. In some implementations, the configuration is specific to a particular data source or group of data sources.

In some implementations, permissions indicated in a user profile may limit access of the user to information within the configuration. In addition, the permissions may limit the ability of the user to generate or modify a configuration. Permissions may be specified with the user profile. Alternatively, Error Rate Handler 112 may determine based, at least in part, on a role of the user indicated within the user profile a corresponding set of permissions. Therefore, Error Rate Handler 112 may access the permissions of the user during configuration to ensure that the user has permission to access Error Rate Handler 112, access configuration(s) associated with a particular data source, or generate/modify a configuration associated with the particular data source.

GUI 400 may provide a user interface object including one or more user interface elements configured to receive input from a user such as a user input box or menu that facilitates configuration of at least one Data Source 404 for which he or she wishes notifications to be transmitted. More particularly, the user interface object may provide a plurality of user-selectable options corresponding to a plurality of data sources from which a user can select a set of one or more data sources. In this example, the user inputs or selects Data Source A 406. In some implementations, Error Rate Handler 112 verifies that the user has permission to configure Error Rate Handler 112 to generate notifications in association with Data Source A.

In addition, for Tier 402, the user may configure an Error Rate Threshold 408 above which error notifications are to be transmitted. GUI 400 may provide a user interface object including one or more user interface elements and the user may select or input a desired error rate threshold, as shown at 410. For example, the user may indicate that notifications of errors are not to be transmitted, that notifications are to be transmitted for all errors, or that notifications are to be transmitted when the current error rate threshold exceeds the desired error rate threshold 410. In this example, the user configures an error rate threshold 410 of 0.05 percent.

The user may further configure, for Tier 402, a set of notification parameters. The set of error notification parameters may indicate one or more target sets of individuals (e.g., addressees) to be notified of errors in data obtained from Data Source 404 according to the configuration. For each Target Set of Individuals 412, the user may configure parameter values for one or more corresponding notification parameters. These notification parameters may include, for example, Communication Channel(s) 414 via which the set of individuals is to be notified, a Notification Time 416, and/or a Notification Frequency 418. In addition, the notification parameters may further indicate content that is to be transmitted in notifications generated and transmitted to the Target Set of Individuals 412. For example, the content may indicate an action to be taken by the user to prevent the user from receiving further notifications, to identify the cause of the errors, and/or to fix the cause of the errors.

GUI 400 may provide a user interface object that includes a user input box and/or is configured to provide a plurality of user-selectable options identifying individuals or groups of individuals from which the user can select Target Set of Individuals 412 to be notified in association with errors detected in data obtained from Data Source 404. An individual may be identified, for example, by name and/or role within the organization. In this example, the user inputs or selects a single Target Set of Individuals 412. More particularly, the user selects or inputs Aaron Popelka 420. Thus, in this example, the Target Set of Individuals 412 identifies a single individual. However, this example is merely illustrative, and the configuration of Tier 402 may include configuration parameter values for any number of sets of individuals, each of which may correspond to one or more individuals or groups of individuals.

For example, the user may wish for their boss, James Jamison, to receive notifications in association with the same error rate threshold 410, in addition to Aaron Popelka. Thus, the user may further identify James Jamison at 420. In addition, the user may further provide additional parameter values in association with notifications to be sent to James Jamison, as will be described in further detail below. In the event that the user does not specify a parameter value for a given parameter, a default parameter value may be applied.

In addition, GUI 400 may provide a user interface object that includes a user input box and/or is configured to provide a plurality of user-selectable options identifying communication channels from which a user can select desired channel(s) via which a notification is to be sent to the target set of individuals. For example, for Communication Channel(s) 414, the user may elect to have a notification transmitted via Email, text message, and/or phone call. In this example, the user selects Email, as shown at 422.

In some implementations, the user may specify or select one or more email addresses and/or phone numbers, as appropriate. For example, the user may provide the email addresses for Aaron Popelka and may also choose to provide the email address for James Jamison. In some implementations, Error Rate Handler 112 may access this contact information from user profiles corresponding to individuals (or groups) identified for Target Set of Individuals 412.

In some implementations, the user may configure a Notification Time 416 at which notification(s) are to be transmitted. As described above, a user interface object may facilitate the entry or selection of a pertinent time or time period. Notification Time 416 may indicate a specific time at which notification(s) are to be transmitted. Alternatively, Notification Time 416 may indicate a period of time during which it is acceptable to transmit a notification to Set of Individuals 412. In this example, the user indicated that the desired notification time is a period of time 9 AM-9 PM, as shown at 424.

In addition, the user may configure a Notification Frequency 418 indicating a frequency with which notification(s) are to be transmitted to Set of Individuals 412. As described above, a user interface object may facilitate configuration of Notification Frequency 418. In this example, the user selects or inputs the desired notification frequency, Hourly, as shown at 426.

In some implementations, the configuration may include or be derived using a set of rules implemented by Error Rate Handler 112. In some implementations, the set of rules may be configured by a user via a GUI. In other implementations, the set of rules may be statically configured or may be implicit in the configuration.

A rule may include one or more operators such as AND, OR, NOT, =, >, or <. In addition, a rule may include conditional language such as IF or WHEN. Moreover, a rule may include language such as "MAX," "ALWAYS," or "AT LEAST." A set of rules may be associated with one or more tenants, an organization, a team, a user, a particular data source or set of data sources, a particular context, a particular notification parameter, and/or a particular notification parameter value.

A rule may include one or more operands. Each operand may be static or configurable. For example, an operand may include a variable corresponding to a parameter. Therefore, a rule or portion thereof may correspond to a particular parameter value being configured or that has previously been configured by the user.

The configuration of a parameter may include the generation of a set of rules in addition to, or instead of, a particular parameter value. For example, the user may configure conditions that, when satisfied, discontinue the notifications. As another example, the user may configure a set of rules that indicate conditions under which each of two or more communication channels are to be used to transmit notifications to Set of Individuals 412. As yet another example, the user may configure a set of rules that indicate different notification parameter values according to the current time of day or day of the week.

Figure 4B:
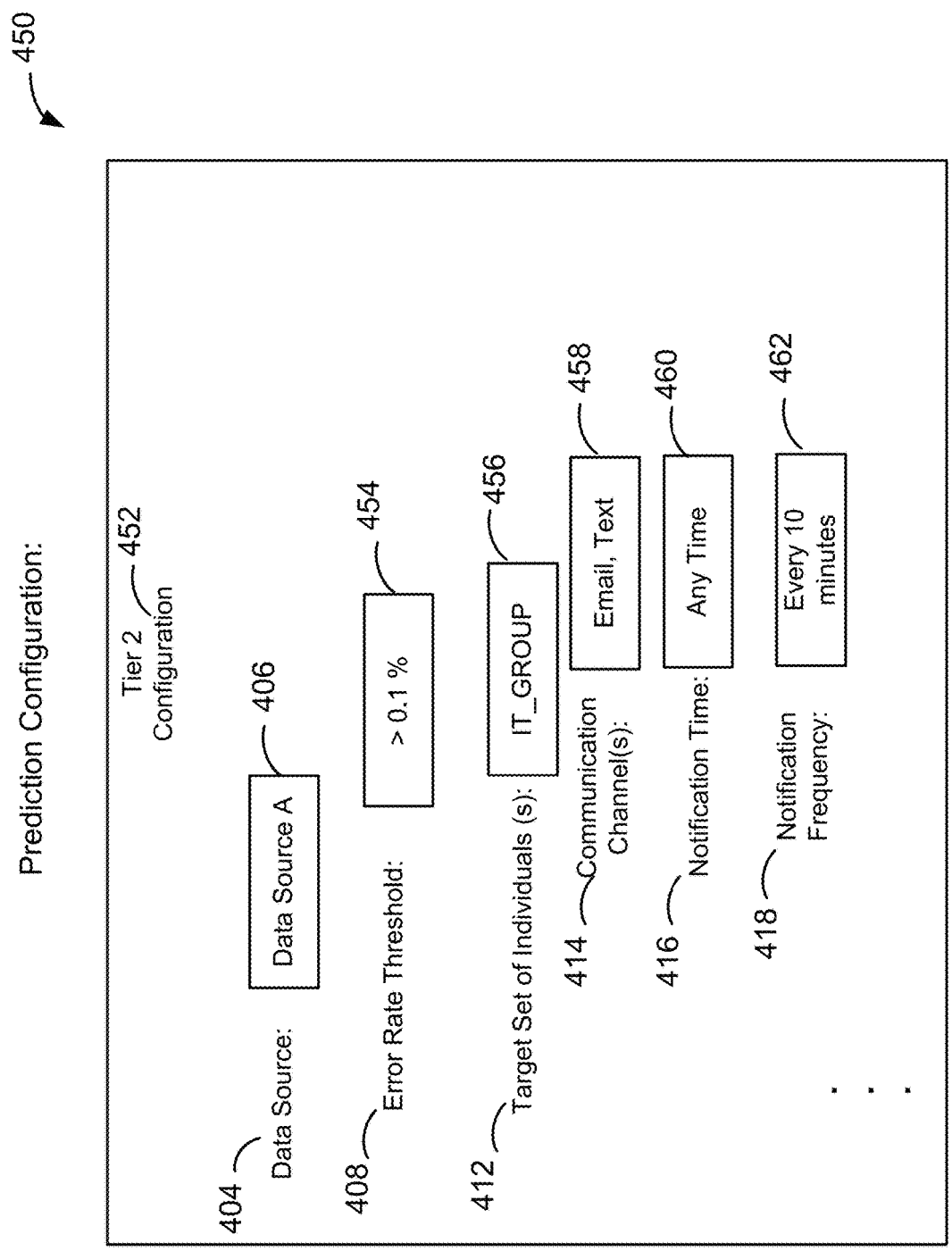
FIG. 4B shows an example of a GUI 450 including a configuration interface for facilitating configuration of a second tier of a hierarchical configuration for presentation on a display device of a client device in an on-demand database service environment, in accordance with some implementations.

A user may continue to configure Error Rate Handler 412 in association with Data Source 404. FIG. 4B shows an example of a GUI 450 including a configuration interface for facilitating configuration of a second tier of a hierarchical configuration for presentation on a display device of a client device in an on-demand database service environment, in accordance with some implementations. As shown in FIG. 4B, the user configures a second tier, Tier 452, in association with Data Source A 406.

Each tier of the hierarchical configuration may correspond to a different error rate threshold. In this example, the user configures Error Rate Threshold 408 to be 0.1%%, as shown at 454. During execution, Error Rate Handler 112 may apply or traverse the tiers in an order from the lowest error rate threshold to the highest error rate threshold or vice versa, as will be described in further detail below. However, during configuration, the user may not configure tiers in this order. Therefore, Error Rate Handler 112 may sort the tiers from lowest error rate threshold to highest rate threshold (or vice versa) prior to storing the configuration and/or executing according to the configuration.

The user may further configure Tier 452 to send notifications to IT_GROUP 456 via email and text, as shown at 458. When the error rate for Data Source A 406 is determined to exceed the error rate threshold 454, notifications are transmitted to IT_GROUP via the selected communication channels. Since error rate 454 is deemed by the user to be significant, the configuration indicates that notifications can be transmitted Any Time 460 with a frequency of 10 minute intervals, as shown at 462.

In some implementations, a configuration tier can indicate that notification parameter values change with the passage of time. For example, a rule may be configured such that after 30 minutes, the frequency increases to transmission of notifications at 5 minute intervals. Therefore, a configuration tier can be configured via a set of rules to support more complex configuration schemes.

Upon generating a configuration or modifying an existing configuration, the configuration may be stored for later retrieval by Error Rate Handler 112. The configuration may be stored in association with an organization, a group within the organization, or user within the organization, as described herein. The organization may be associated with one or more tenants of a multi-tenant database system.

Figure 5:
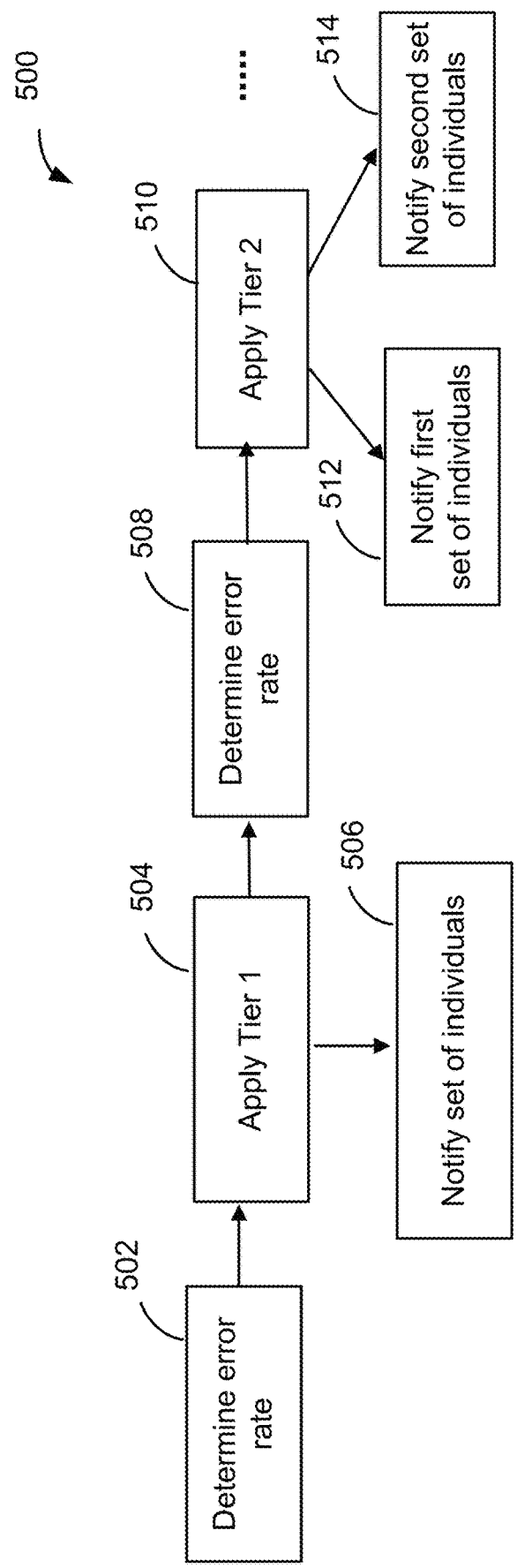
FIG. 5 shows an example of an application of a hierarchical configuration during error rate handling, in accordance with some implementations.

Through the configuration and implementation of a hierarchical configuration that facilitates error rate notification, it is possible to notify those individuals most qualified to identify and correct system anomalies causing data errors of which they are notified. FIG. 5 shows an example of an application of a hierarchical configuration during error rate handling, in accordance with some implementations. Error Rate Handler 112 periodically calculates the error rate. In this example, Error Rate Handler 112 determines the error rate (502) and applies the first tier of the configuration, Tier 1, to send notifications upon determining that the error rate exceeds the error rate threshold of Tier 1 (504). In this example, Tier 1 configuration specifies that a single set of individuals is notified. Therefore, Error Rate Handler 112 proceeds to send notifications to the set of individuals according to Tier 1 configuration (506).

Error Rate Handler 112 subsequently determines the error rate (508) at a later point in time. Upon determining that the error rate exceeds the higher error rate threshold of Tier 2, Error Rate Handler 112 applies Tier 2 configuration to send notifications according to Tier 2 parameter values (510). In this example, Tier 2 configuration specifies that two different sets of individuals are to be notified. Thus, Error Rate Handler 112 generates and transmits notifications to each set of individuals 512, 514.

During execution of Error Rate Handler 112, notifications may be transmitted in parallel to sets of individuals identified within a single configuration tier. This may be accomplished, for example, by multiple processors using a multi-threaded process.

A configuration including two or more tiers may be stored in one or more data structures. The data structure may indicate a hierarchy of the tiers and therefore an order in which the configuration tiers are to be applied during execution of Error Rate Handler 112. For example, the data structure may include a linked list or tree data structure.

Figure 6:
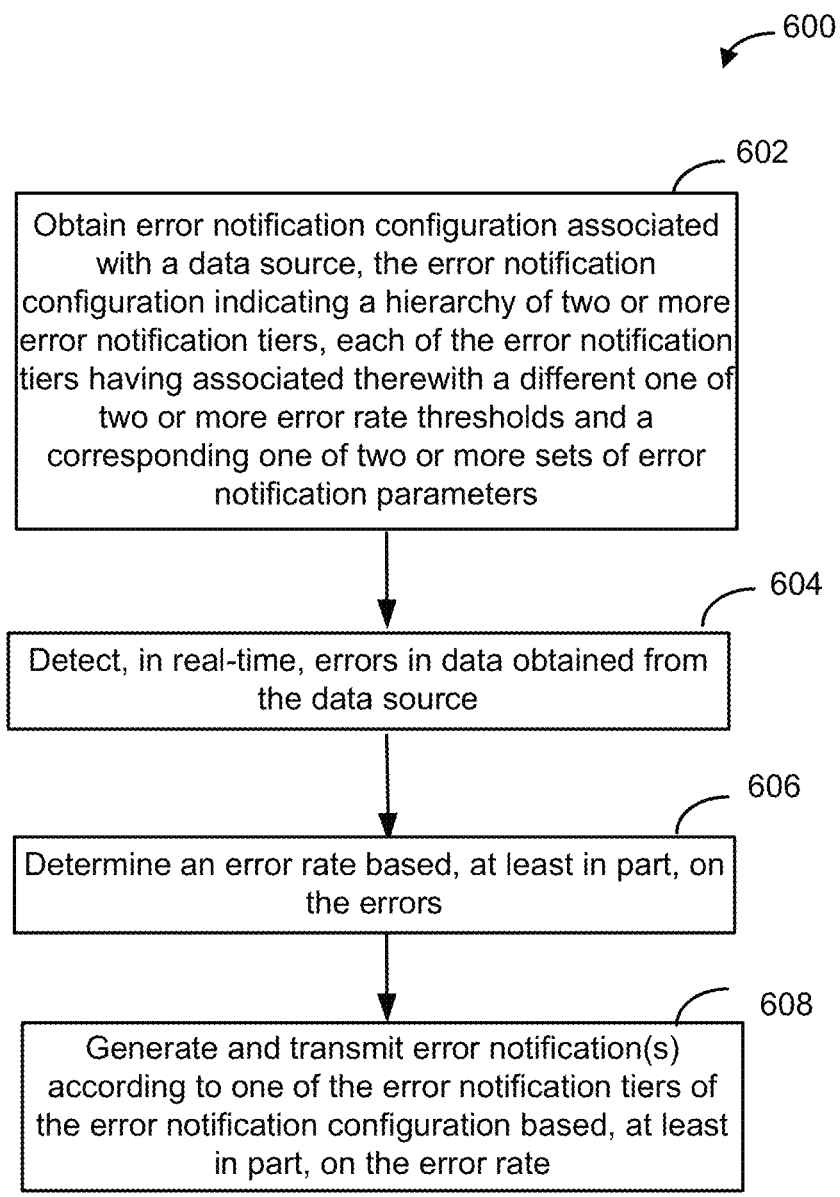
FIG. 6 shows a flow diagram of a method 600 for generating and transmitting notifications of data errors according to a hierarchical configuration in an on-demand database service environment, in accordance with some implementations.

FIG. 6 shows a flow diagram of a method 600 for generating and transmitting notifications of data errors according to a hierarchical configuration in an on-demand database service environment, in accordance with some implementations. The system may obtain an error notification configuration associated with at least one data source, where the error notification configuration indicates a hierarchy of two or more error notification tiers (602). Each of the error notification tiers has associated therewith a different one of two or more error rate thresholds and a corresponding one of two or more sets of error notification parameters. Each set of error notification parameters may indicate one or more sets of individuals to be notified of errors in data obtained from the data source and for each set of individuals, at least one communication channel via which the set of individuals is to be notified.

In accordance with various implementations, the hierarchy may indicate an order in which the error notification thresholds are to be applied or traversed. This may be accomplished via a data structure such as a tree or linked list that indicates the order in which the error notification tiers are to be applied or traversed. In other words, the data structure may indicate an order of the tiers from lowest error notification threshold to highest error notification threshold, or vice versa.

A set of individuals may correspond to a particular set of roles within an organizational hierarchy. In some implementations, the set of individuals may be identified by the corresponding role. For example, the set of individuals may be identified as "Sales Group," "IT Group," or "Director of Operations."

The communication channel associated with a set of individuals can indicate one or more of: electronic mail (email), text message, short message service (sms) message, or phone call. In addition, the communication channel can further indicate a particular phone number, email address, device, and/or type of device.

In some implementations, at least one of the sets of error notification parameters further indicates one or more of: a notification frequency with which the corresponding set of individuals is to be notified, a time during which the set of individuals can be notified, content to be transmitted to the corresponding set of individuals within a notification, a link to be transmitted to the corresponding set of individuals, a type of the errors that have been detected, or an error code identifying the type of the errors that have been detected. The content and/or link can indicate, to the set of individuals receiving the notification, a particular mechanism for suspending or terminating transmittal of notifications to the set of individuals, a particular mechanism to facilitate resolving a cause of the errors detected, and/or a web page to be accessed by the set of individuals. The web page can facilitate monitoring of the errors for the data source, suspending or terminating transmittal of notifications, and/or resolving the cause of the errors detected.

As described above, the system may retrieve the error notification configuration from a storage medium or obtain the error notification configuration via a GUI in the event it has been recently configured, as described herein. More particularly, the system may provide at least one GUI including at least one user interface object for display by a client device, the user interface object including one or more user interface elements configured to obtain user input in relation to configuration of error rate handling. The system may obtain, via the graphical user interface (GUI), an indication of the error notification configuration in association with at least one data source. The system may store or update the error notification configuration such that the error notification configuration indicates the hierarchy of two or more error notification tiers in association with the data source.

Data may be obtained from the data source according to a variety of mechanisms. More particularly, data may be obtained via a push method, a pull method, or streaming. In some implementations, the data is obtained via a data retrieval configuration that indicates the mechanism via which the data is to be retrieved from the data source. In the event that the data is to be obtained from the data source via a push or pull method, the data retrieval configuration can further indicate a frequency with which data is to be obtained.

In some implementations, the error notification configuration can enable the user to associate a particular error notification configuration or tier with a specific data retrieval configuration. Thus, the error notification configuration may associate at least a subset of the error notification parameters or parameter values with a corresponding data retrieval configuration. In other words, the error notification configuration can provide for different error notification configurations for different data retrieval configurations (e.g., data retrieval mechanisms and/or frequencies). In some implementations, this may be accomplished via a particular set of rules that has been configured. As a result, the system may automatically switch between two or more error notification configurations in the event that the data retrieval configuration for a data source is modified. In other implementations, the user may choose to select a combined error notification-data retrieval configuration from multiple options presented via a menu or other user interface.

The system may detect, in real-time, errors in data obtained from the data source over a period of time (604). For examples, errors in data may occur as a result of corruption of the data or unexpected data values. The system may determine an error rate based, at least in part, on the errors detected over the period of time (606).

The system may then generate and transmit error notification(s) according to one of the notification tiers of the error notification configuration based, at least in part, on the error rate (608). More particularly, upon detecting that the error rate exceeds one of the error rate thresholds, the system may apply the corresponding set of error notification parameters to generate and transmit notification(s). In some implementations, only a single one of the notification tiers is used to generate and transmit the error notification(s) for the error rate. Later, when the error rate increases, the system may apply another one of the notification tiers to generate and transmit error notification(s).

In some implementations, the system may ascertain that the error rate exceeds one or more of the error rate thresholds. Where the error rate exceeds a single one of the error rate thresholds, the system may apply the corresponding set of error notification parameters to generate and transmit notification(s). Alternatively, where more than one error rate threshold has been exceeded, the system may apply the highest error rate threshold that is exceeded by the error rate.

In some implementations, the hierarchy is traversed such that a highest one of the error rate thresholds that is exceeded by the error rate is determined. The system may identify the set of error notification parameters associated with the highest one of the error rate thresholds that is exceeded by the error rate, and generate and transmit one or more error notifications according to the identified set of error notification parameters. In the event that a set of individuals is identified in a configuration without specific contact information, the error rate handler may access contact information from user profiles of the individuals to generate and transmit the notifications. A notification can indicate the identity of the data source, the error rate, and/or the error rate threshold that has been exceeded.

Figure 7:
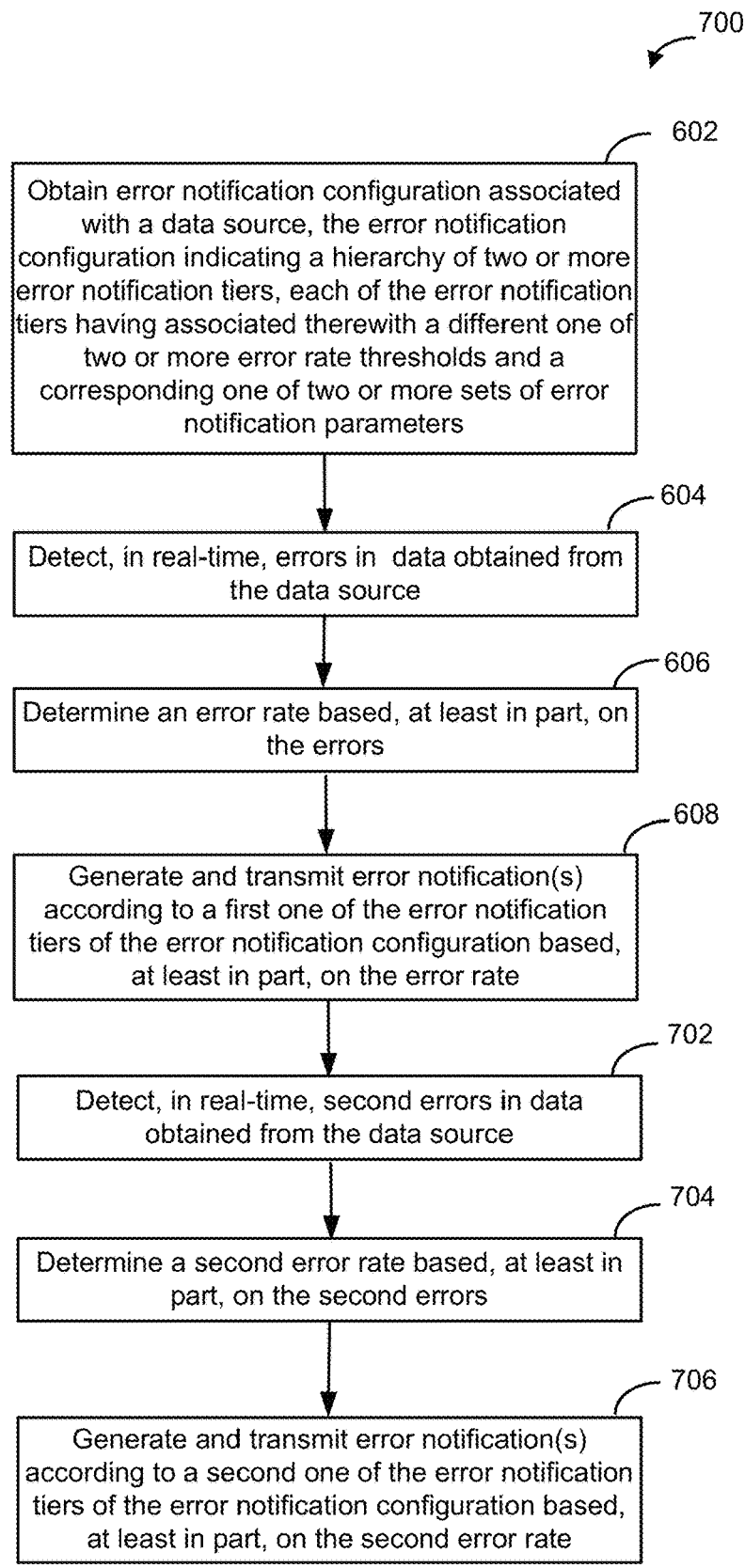
FIG. 7 shows a flow diagram of another method 700 for generating and transmitting notifications of data errors according to a hierarchical configuration in an on-demand database service environment, in accordance with some implementations.

As the system continues to obtain data and detect errors, further notifications may be generated and transmitted as the error rate increases. FIG. 7 shows a flow diagram of another method 700 for generating and transmitting notifications of data errors according to a hierarchical configuration in an on-demand database service environment, in accordance with some implementations. The system may traverse the hierarchy as the error rate increases. For example, the system may traverse the hierarchy according to a top-down or bottom-up order (e.g., from a lowest error rate threshold to a highest error rate threshold or, alternatively, from a highest error rate threshold to a lowest error rate threshold). The system may traverse the tiers of the hierarchy such that the error rate thresholds that are applied increase over time as the error rate increases. As the system traverses the tiers of the hierarchy, the system may compare the error rate against the error rate threshold of a corresponding tier of the hierarchy. Upon identifying the highest error rate threshold exceeded by the error rate, the system may apply the corresponding set of error notification parameters to generate and transmit notification(s).

In some implementations, Error Rate Handler 112 begins monitoring the obtained data to detect errors. Upon determining the error rate, Error Rate Handler 112 may begin traversing the hierarchy and compares the error rate to the error rate threshold of a first tier having the lowest error rate threshold and continues until the error rate does not exceed the error rate threshold of a further tier. Error Rate Handler 112 may then generate and transmit notification(s) using the set of notification parameters for the tier having the highest error rate threshold exceeded by the error rate (e.g., the tier processed prior to the further tier).

In other implementations, Error Rate Handler 112 may traverse the hierarchy and compare the error rate to the error rate threshold of a first tier having the highest error rate threshold and continue until the error rate exceeds the error rate threshold of that tier. Error Rate Handler 112 may then generate and transmit notification(s) using the set of notification parameters for that tier, which has the highest error rate threshold exceeded by the error rate.

After generating and transmitting one or more error notifications according to a first one of the error notification tiers, the system may detect, in real-time, second errors in data obtained from the data source over a second period of time (702). The system determines a second error rate based, at least in part, on the second errors detected over a second period of time (704). The system then generates and transmits second one or more error notification(s) according to a second one of the error notification tiers of the error notification configuration based, at least in part, on the second error rate (706). More particularly, the system may generate and transmit the second error notification(s) after determining that the second error rate exceeds a second error rate threshold of the second error notification tier. As described herein, the second error rate threshold may the highest error rate threshold exceeded by the second error rate. In some instances, the second error notification tier may be a notification tier that immediately succeeds or is adjacent to the first error notification tier within the corresponding data structure.

In some implementations, during traversal of the hierarchy, the system maintains a pointer or other suitable identifier that identifies the tier most recently applied to generate and transmit notification(s). The system may therefore proceed with traversing the hierarchy from that point forward.

As described above, the system may generate and transmit notification(s) using a set of error notification parameters of the error notification tier having the highest error rate threshold that is exceeded by the error rate. Upon determining that a higher error rate threshold of another error notification tier is exceeded as the error rate increases, notifications being to transmitted in association with the lower error rate threshold may be discontinued. Alternatively, the set of individuals may be notified that the error rate has exceeded a further error rate threshold and that another second set of individuals is being notified. For example, the set of individuals may be notified of the specific further error rate threshold that has recently been exceeded, and may also indicate the identity of the second set of individuals.

Each notification can include a message that is transmitted, as described herein. Upon receiving a notification, the set of individuals may take appropriate action. In some instances, the set of individuals can interact with Database System 102 to halt processing of data or temporarily suspend processing of the data. Therefore, the set of individuals may respond to error rate notifications by interacting with or modifying system components to eliminate or reduce further errors.

Some implementations may incorporate various technologies for constructing pages. For example, one or more components or pages may be constructed using Lumen, Ext, ExtJS, Flex, and/or VisualForce™ technologies available from Salesforce.com®. As another example, one or more components or pages may be constructed using Flash, Ajax, HTML, JavaScript®, or other publicly available technologies.

In some implementations, one or more technologies developed by Salesforce.com®, such as the Web Services API, VisualForce™, and/or Apex Service-oriented Architecture ("SOA") may be used to display and/or integrate disparate data sources from across multiple systems. The apparatus and methods described herein may be designed or configured for use with various web browsers, such as IE 7+, Firefox 3.5+, Safari, etc.

In some implementations, performance may be improved by optimizing pages for high performance in a browser environment. Some web analytics and/or online business optimization platforms such as Omniture® may be used to measure the performance and adjust it as needed. In some embodiments, a network operations center ("NOC") may be used to monitor performance and react quickly to performance degradation.

Ext is a JavaScript® platform developed by Salesforce.com® that includes a broad variety of UI components that can be used to develop highly interactive browser UIs. Ext may allow a complex layout. It also has a well-defined event model which facilitates component communication. JavaScript components may be created by subclassing Ext's components.

In some implementations, some or all of the content viewable through the service cloud console will be inside of HTML iframes. The content included inside HTML iframes may include, but is not limited to: detail/edit pages, enhanced list views, customer and Salesforce®-created VisualForce™ pages and any random sites that customers put into custom links. HTML iframes may be useful because they may facilitate putting content of multiple detail/edit pages on the same browser page. Without iframes, for example, there may be conflicting ids and/or broken JavaScript®.

In some implementations, the client machine may communicate with a server via Ajax. The workspace context panel may display a layout-driven grid of fields from the detail page to the user. The HTML for these fields may differ from that in the Detail page because, for example, some complex elements (e.g., lookup) may have specific HTML IDs and output JavaScript® that references those HTML IDs. In order to reconstruct those elements and reassign HTML IDs to redisplay them, the workspace context panel may request the HTML for its fields from a servlet that resolves the HTML ID and JavaScript® issues.

While the present embodiments are described with reference to an on-demand service environment capable of supporting multiple tenants, these embodiments are not limited to multi-tenant databases or deployment on application servers. Embodiments may be practiced using other database architectures, for instance, ORACLE®, DB2® by IBM, and the like without departing from the scope of the embodiments claimed.

Techniques described or referenced herein can be implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
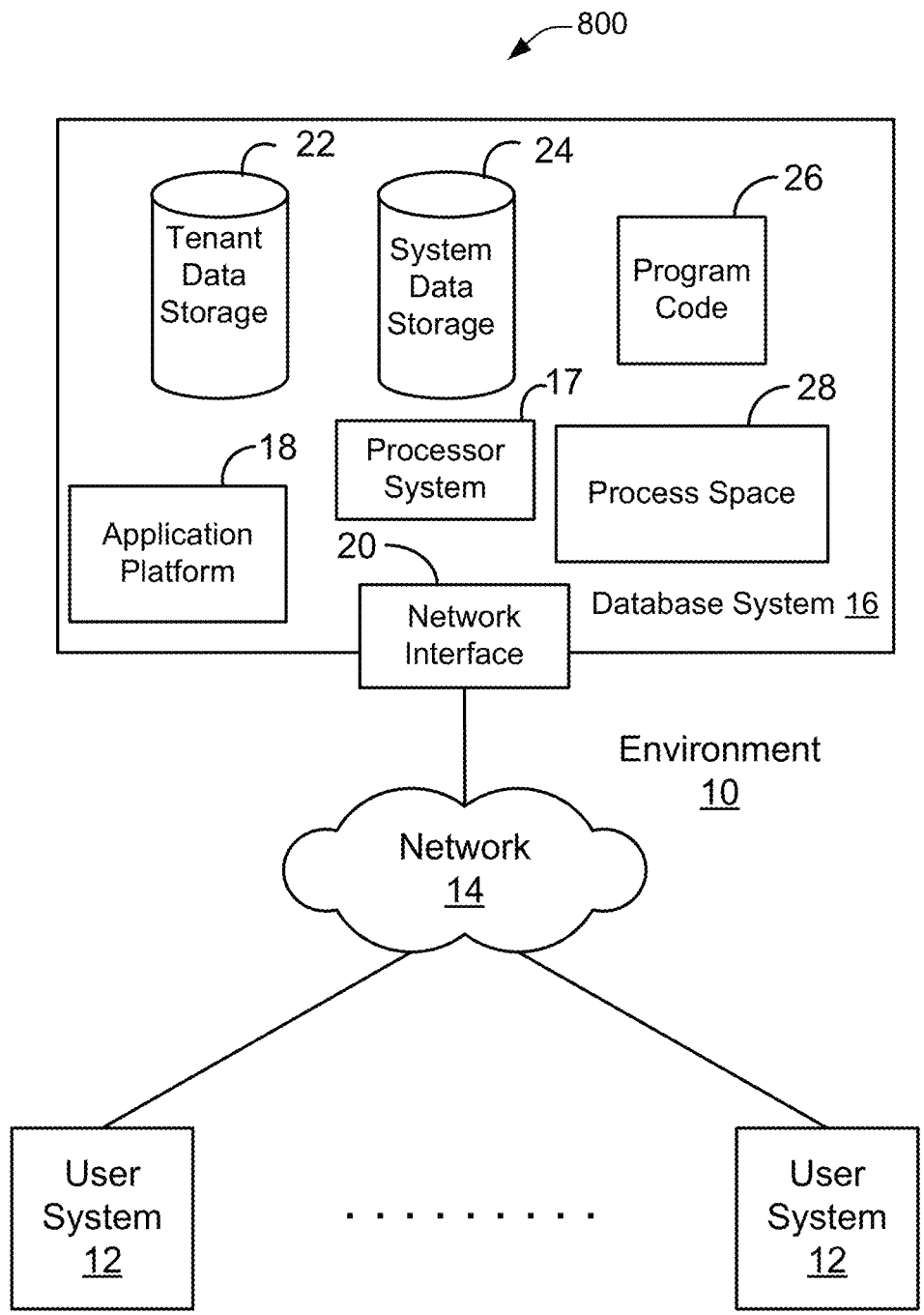
FIG. 8A shows a block diagram of an example of an environment 800 in which an on-demand database service can be used, in accordance with some implementations.

FIG. 8A shows a block diagram of an example of an environment 800 in which an on-demand database service can be used, in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 8B:
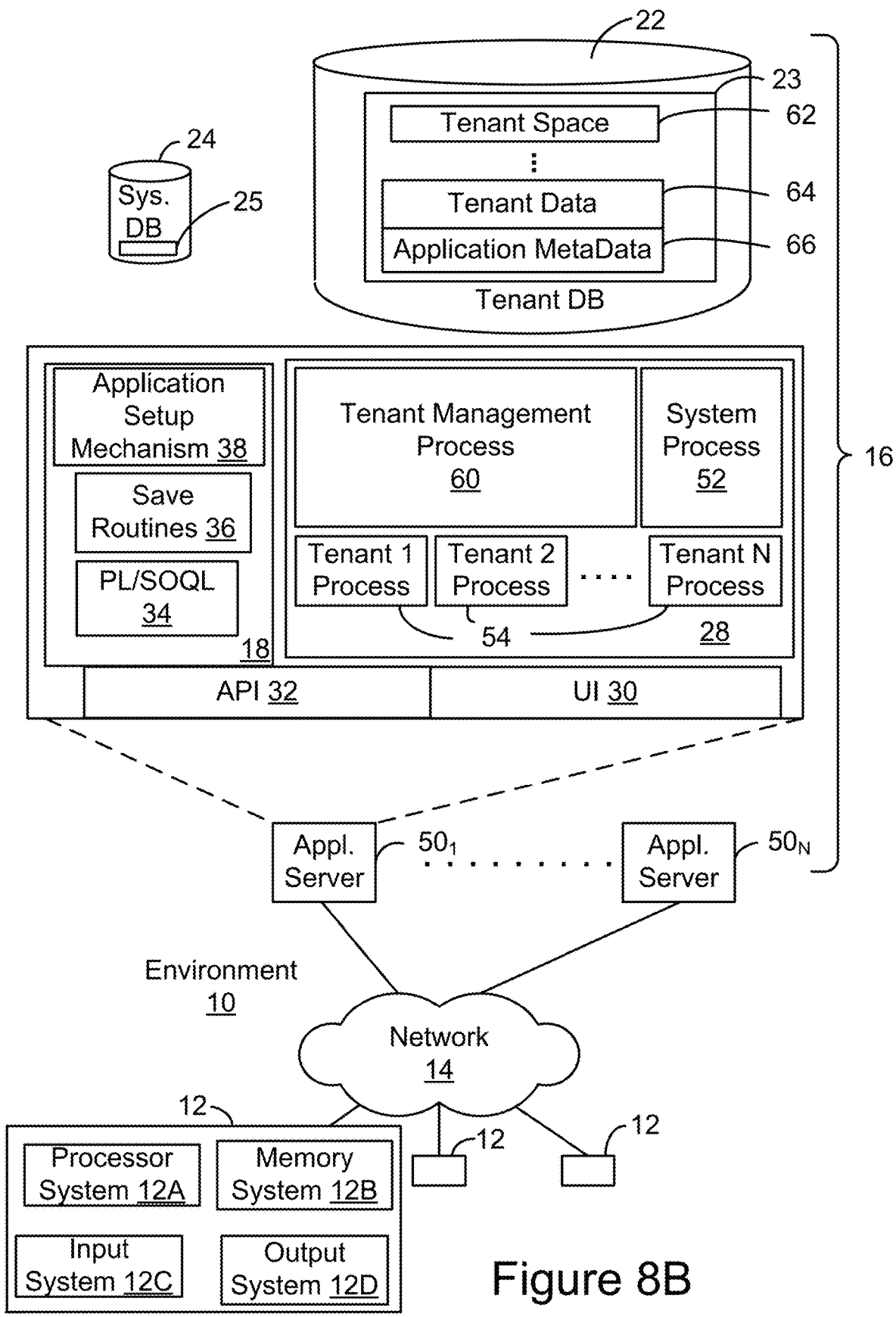
FIG. 8B shows a block diagram of an example of some implementations of elements of FIG. 8A and various possible interconnections between these elements, in accordance with some implementations.

One arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 8B shows a block diagram of an example of some implementations of elements of FIG. 8A and various possible interconnections between these elements. That is, FIG. 8B also illustrates environment 10. However, in FIG. 5B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
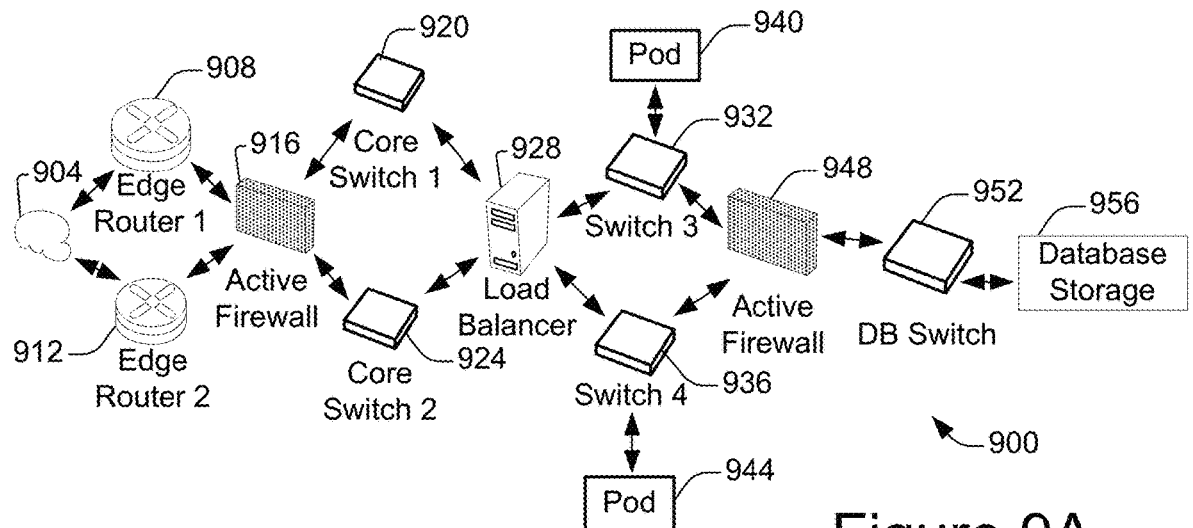
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 9B:
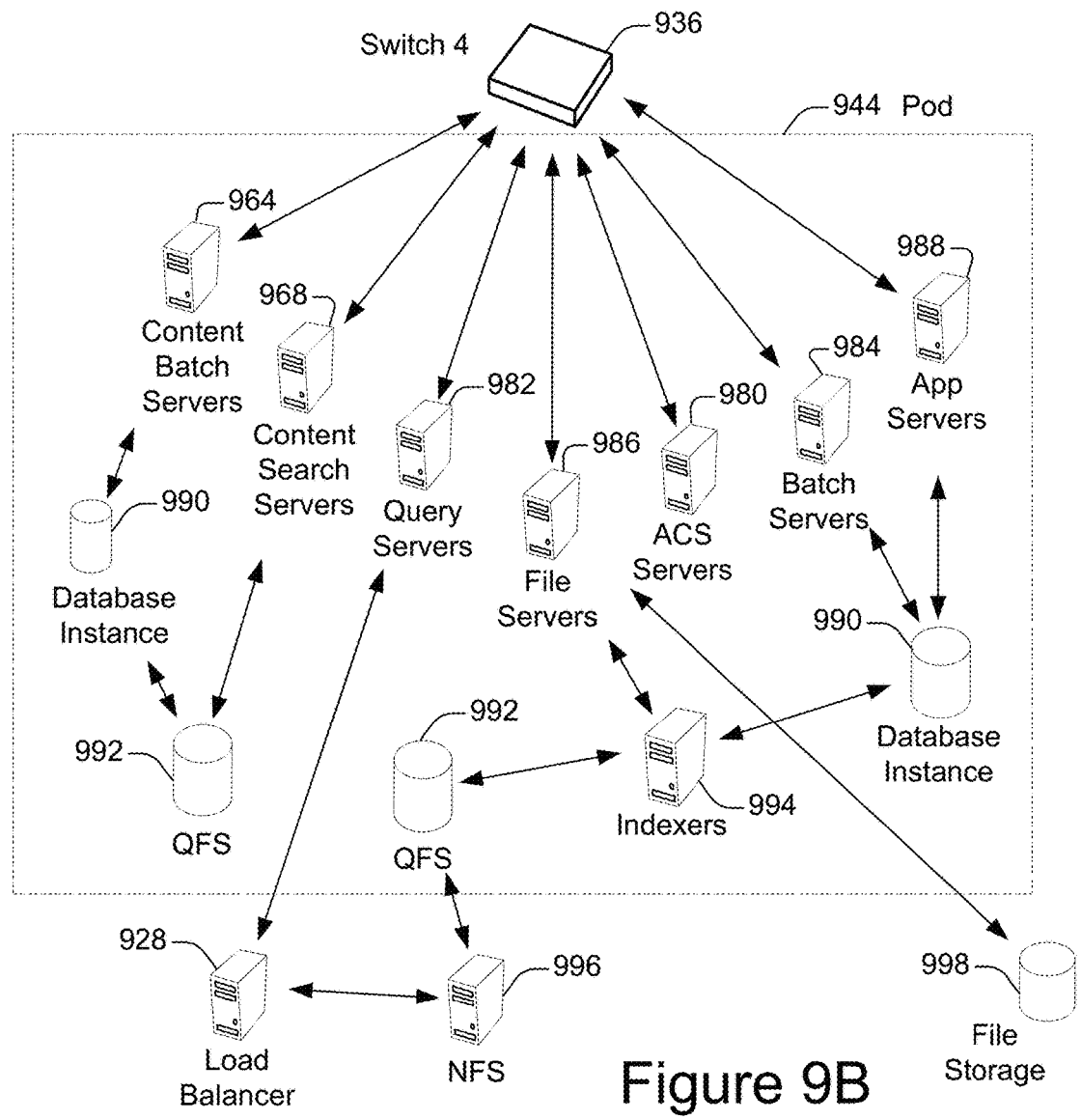
FIG. 9B shows a system diagram further illustrating an example of architectural components of an on-demand database service environment, in accordance with some implementations.

As shown in FIGS. 9A and 9B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 9A and 9B, some implementations of an on-demand database service environment may include anywhere from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 6B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 8A and 8B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 8A, 8B, 9A and 9B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 5A and 5B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 8A, 8B, 9A and 9B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
    a database system implemented using a server system, the database system configurable to cause:
        providing at least one graphical user interface (GUI) including at least one user interface object for display by a client device, the user interface object including one or more user interface elements configured to obtain user input in relation to configuration of error rate handling;
        obtaining an indication of an error notification configuration received from the client device, the error notification configuration being associated with at least one data source and including a hierarchy of two or more error notification tiers, each of the error notification tiers having associated therewith a different corresponding one of two or more error rate thresholds and a corresponding one of two or more sets of error notification parameters, each set of error notification parameters indicating one or more sets of individuals to be notified of errors in data obtained from the data source that exceed the corresponding error rate threshold and indicating, for each set of individuals, at least one corresponding communication channel via which the set of individuals is to be notified;
        storing the error notification configuration such that the error notification configuration is associated with the data source;
        detecting, in real-time, errors in data obtained from the data source over a period of time;
        determining an error rate based, at least in part, on the errors detected over the period of time; and
        generating and transmitting one or more error notifications according to one of the notification tiers of the error notification configuration based, at least in part, on the error rate.

2. The system of claim 1, wherein generating and transmitting one or more error notifications according to one of the notification tiers of the error notification configuration is performed according to a first one of the error notification tiers of the error notification configuration based, at least in part, on the error rate, the system further configurable to cause:
    after generating and transmitting the one or more error notifications according to the first one of the error notification tiers, detecting, in real-time, second errors in data obtained from the data source over a second period of time;
    determining a second error rate based, at least in part, on the second errors detected over a second period of time; and
    generating and transmitting second one or more error notification(s) according to a second one of the error notification tiers of the error notification configuration based, at least in part, on the second error rate.

3. The system of claim 1, the database system further configurable to cause:
    traversing the hierarchy such that a highest one of the error rate thresholds that is exceeded by the error rate is determined; and
    identifying the set of error notification parameters associated with the highest one of the error rate thresholds that is exceeded by the error rate;
    wherein the one or more error notifications are generated and transmitted according to the identified set of error notification parameters.

4. The system of claim 1, the hierarchy indicating an order in which the error notification thresholds are to be applied.

5. The system of claim 1, the hierarchy indicating an order in which the error notification tiers are to be traversed.

6. The system of claim 1, at least one of the sets of error notification parameters further indicating one or more of: a notification frequency, a time during which the set of individuals can be notified, content to be transmitted to the corresponding set of individuals, a link to be transmitted to the corresponding set of individuals, a type of the errors, or an error code identifying the type of the errors.

7. The system of claim 1, the communication channel indicating one or more of: an electronic mail (email), a text message, a short message service (sms) message, phone call, a particular phone number, a particular email address, a particular device, and/or a particular type of device.

8. A computer program product comprising computer-readable program code capable of being executed by one or more processors when retrieved from a non-transitory computer-readable medium, the program code comprising instructions configurable to cause:

providing at least one graphical user interface (GUI) including at least one user interface object for display by a client device, the user interface object including one or more user interface elements configured to obtain user input in relation to configuration of error rate handling;

obtaining an indication of an error notification configuration received from the client device, the error notification configuration being associated with at least one data source and including a hierarchy of two or more error notification tiers, each of the error notification tiers having associated therewith a different corresponding one of two or more error rate thresholds and a corresponding one of two or more sets of error notification parameters, each set of error notification parameters indicating one or more sets of individuals to be notified of errors in data obtained from the data source that exceed the corresponding error rate threshold and indicating, for each set of individuals, at least one corresponding communication channel via which the set of individuals is to be notified;

storing the error notification configuration such that the error notification configuration is associated with the data source;

detecting, in real-time, errors in data obtained from the data source over a period of time;

determining an error rate based, at least in part, on the errors detected over the period of time; and generating and transmitting one or more error notifications according to one of the notification tiers of the error notification configuration based, at least in part, on the error rate.

9. The computer program product of claim 8, wherein generating and transmitting one or more error notifications according to one of the notification tiers of the error notification configuration is performed according to a first one of the error notification tiers of the error notification configuration based, at least in part, on the error rate, the program code further comprising instructions configurable to cause:

after generating and transmitting the one or more error notifications according to the first one of the error notification tiers, detecting, in real-time, second errors in data obtained from the data source over a second period of time;

determining a second error rate based, at least in part, on the second errors detected over a second period of time; and generating and transmitting second one or more error notification(s) according to a second one of the error notification tiers of the error notification configuration based, at least in part, on the second error rate.

10. The computer program product of claim 8, the program code further comprising instructions configurable to cause:

traversing the hierarchy such that a highest one of the error rate thresholds that is exceeded by the error rate is determined; and identifying the set of error notification parameters associated with the highest one of the error rate thresholds that is exceeded by the error rate;

wherein the one or more error notifications are generated and transmitted according to the identified set of error notification parameters.

11. The computer program product of claim 8, the hierarchy indicating an order in which the error notification thresholds are to be applied.

12. The computer program product of claim 8, the hierarchy indicating an order in which the error notification tiers are to be traversed.

13. The computer program product of claim 8, at least one of the sets of error notification parameters further indicating one or more of: a notification frequency, a time during which the set of individuals can be notified, content to be transmitted to the corresponding set of individuals, a link to be transmitted to the corresponding set of individuals, a type of the errors, or an error code identifying the type of the errors.

14. A method, comprising:

providing at least one graphical user interface (GUI) including at least one user interface object for display by a client device, the user interface object including one or more user interface elements configured to obtain user input in relation to configuration of error rate handling;

obtaining an indication of an error notification configuration received from the client device, the error notification configuration being associated with at least one data source and including a hierarchy of two or more error notification tiers, each of the error notification tiers having associated therewith a different corresponding one of two or more error rate thresholds and a corresponding one of two or more sets of error notification parameters, each set of error notification parameters indicating one or more sets of individuals to be notified of errors in data obtained from the data source that exceed the corresponding error rate threshold and indicating, for each set of individuals, at least one corresponding communication channel via which the set of individuals is to be notified;

storing the error notification configuration such that the error notification configuration is associated with the data source;

detecting, in real-time, errors in data obtained from the data source over a period of time;

determining an error rate based, at least in part, on the errors detected over the period of time; and generating and transmitting one or more error notifications according to one of the notification tiers of the error notification configuration based, at least in part, on the error rate.

15. The method of claim 14, wherein generating and transmitting one or more error notifications according to one of the notification tiers of the error notification configuration is performed according to a first one of the error notification tiers of the error notification configuration based, at least in part, on the error rate, the method further comprising:

after generating and transmitting the one or more error notifications according to the first one of the error notification tiers, detecting, in real-time, second errors in data obtained from the data source over a second period of time;

determining a second error rate based, at least in part, on the second errors detected over a second period of time; and generating and transmitting second one or more error notification(s) according to a second one of the error notification tiers of the error notification configuration based, at least in part, on the second error rate.

16. The method of claim 14, further comprising:
traversing the hierarchy such that a highest one of the error rate thresholds that is exceeded by the error rate is determined; and
identifying the set of error notification parameters associated with the highest one of the error rate thresholds that is exceeded by the error rate;
wherein the one or more error notifications are generated and transmitted according to the identified set of error notification parameters.

17. The method of claim 14, the hierarchy indicating an order in which the error notification thresholds are to be applied.

18. The method of claim 14, the hierarchy indicating an order in which the error notification tiers are to be traversed.

19. The method of claim 14, at least one of the sets of error notification parameters further indicating one or more of: a notification frequency, a time during which the set of individuals can be notified, content to be transmitted to the corresponding set of individuals, a link to be transmitted to the corresponding set of individuals, a type of the errors, or an error code identifying the type of the errors.

20. The method of claim 14, the communication channel indicating one or more of: an electronic mail (email), text message, a short message service (sms) message, a phone call, a particular phone number, a particular email address, a particular device, and/or a particular type of device.

* * * * *